United States Patent [19]
Crawford

[11] 3,882,242
[45] May 6, 1975

[54] INSECTICIDAL ESTERS OF 1-ACENAPHTHENOL

[75] Inventor: Robert J. Crawford, Wyoming, Ohio

[73] Assignee: The Procter & Gamble Company, Cincinnati, Ohio

[22] Filed: May 15, 1974

[21] Appl. No.: 469,994

Related U.S. Application Data

[62] Division of Ser. No. 198,434, Nov. 12, 1971, Pat. No. 3,840,584.

[52] U.S. Cl.............................. 424/305; 424/306
[51] Int. Cl................................................ A01n 9/24
[58] Field of Search......... 424/305, 306; 260/468 H

[56] References Cited
UNITED STATES PATENTS
3,647,857   3/1972   Morgan............................ 260/468

*Primary Examiner*—Jerome D. Goldberg
*Assistant Examiner*—Allen J. Robinson
*Attorney, Agent, or Firm*—William Keith Turner; Jack D. Schaeffer; Richard C. Witte

[57] ABSTRACT

Cyclopropanecarboxylic acid esters of 1-acenaphthenol and substituted 1-acenaphthenols possessing useful insecticidal properties.

2 Claims, No Drawings

INSECTICIDAL ESTERS OF 1-ACENAPHTHENOL

This is a division, of application Ser. No. 198,434, filed Nov. 12, 1971, now U.S. Pat. No. 3,840,584 issued 10/8/74.

BACKGROUND OF THE INVENTION

This invention relates to novel cyclopropanecarboxylic acid esters of 1-acenaphthenol, and derivatives thereof, as well as insecticidal compositions containing said esters as an essential active ingredient.

Current trends in the chemical control of insects call for inherently safer materials which degrade very rapidly to non-toxic substances once their purpose is accomplished. The safety of the widely used chlorinated hydrocarbons, notably DDT, is currently under question largely because of their poor biodegradability and concomitant persistence. Accordingly, there is a great demand for alternative broad spectrum insecticides which are suitable for the high volume usage entailed in agricultural applications. At the same time it is desirable for new insecticides to exhibit a low order of toxicity to warm-blooded animals. Of the several insecticidal classes which demonstrate low mammalian toxicity and good biodegradability, it has long been recognized that pyrethrum, a naturally-occurring insecticidal mixture, possesses these desirable properties. In addition to the safety advantages, this natural mixture causes rapid knock-down and kill of a broad spectrum of insects; however, it is unstable to light, air, and heat, and is very expensive. The most active component of pyrethrum is pyrethrin I and a number of analogous compounds have been proposed for insecticidal use. Allethrin, a typical synthetic pyrethrin-like insecticide, while more stable to light and heat than pyrethrum, is nevertheless expensive, a defect which is compounded by the fact that this substance is not appreciably synergized by the low cost synergizing agents such as piperonyl butoxide which are typically used in insecticidal compositions. Because of instability, high cost and limited supply, the use of pyrethrum and pyrethrin-like insecticides in agricultural applications has been precluded or seriously limited.

At the same time, it is well known that certain insects, in time, become immune to the insecticidal properties of various chemical agents. To be efficient, an insecticide should be able to resist detoxification by the insect. While biological mechanisms whereby insects are capable of detoxifying the various types of insecticidal compounds are not fully understood, it is possible that, as with other biological systems, insects may in time develop new biochemical processes capable of detoxifying any particular insecticidal compound. In any event, it is desirable to have included in the insecticidal armamentarium compounds which can be utilized once a given class of insects is found no longer to respond to conventional insecticidal compounds.

Many prior art insecticidal esters differ from one another and from the natural pyrethrin I esters by virtue of synthetic modifications in the alcohol moiety of the ester. Other synthetic insecticides are pyrethrin-like esters modified in the acid portion of the ester molecule. For example, the copending application of Fanta, entitled "INSECTICIDAL ESTERS," Ser. No. 208,040, filed Dec. 9, 1971; U.S. Pat. No. 3,679,667, July 25, 1972, to W. Fanta; and U.S. Pat. No. 3,465,007, Sept. 2, 1969, to M. Elliott, all relate to various synthetic insecticidal esters of the pyrethrum type. However, a major shortcoming of the prior art synthetic pyrethrin I analogues is their cost, and it is of major interest to provide a class of such analogues which is moderately priced. To achieve this, it is necessary to provide a moderately priced alcohol which, when esterified with an appropriate cyclopropanecarboxylic acid, forms an insecticidal ester. It has now been discovered that 1-acenaphthenol, and the various derivatives thereof, can be used in conjunction with cyclopropanecarboxylic acids to provide insecticidal esters of the pyrethrum type at moderate cost.

It is therefore an object of this invention to provide novel insecticidal 1-acenaphthenol esters of cyclopropanecarboxylic acids which are biodegradable, effect rapid knock-down and kill of a broad spectrum of insects, possess low mammalian toxicity and are less susceptible to detoxification by insects than is pyrethrum. This and other objects are obtained by the present invention as will become apparent from the following disclosure.

SUMMARY OF THE INVENTION

The novel compounds of the present invention include certain cyclopropanecarboxylic acid esters of 1-acenaphthenol and substituted derivatives of 1-acenaphthenol.

This invention also encompasses insecticidal compositions comprising as an essential ingredient an insecticidal amount of certain cyclopropanecarboxylic acid esters of 1-acenaphthenol or a substituted 1-acenaphthenol.

As a method aspect, the present invention encompasses a method of combatting insects comprising applying an insecticidal amount of a cyclopropanecarboxylic acid ester of 1-acenaphthenol or substituted 1-acenaphthenol to an insect or insect habitat.

DETAILED DESCRIPTION OF THE INVENTION

The cyclopropanecarboxylic acid esters of 1-acenaphthenol, tetrahydro-1-acenaphthenols and the derivatives thereof are of the formula

wherein R is a cyclopropane moiety selected from the group consisting of

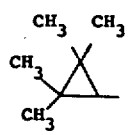 , 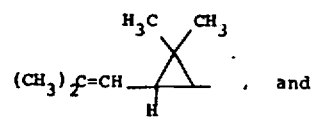 , and

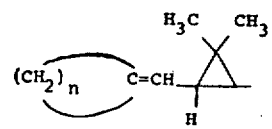

wherein $n$ is an integer of from 4 to 6, preferably 4, and wherein R' is a 1-acenaphthenyl or tetrahydro-1-acenaphthenyl moiety of the formula

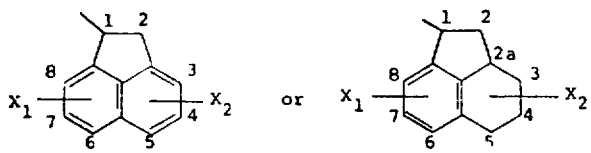

wherein $X_1$ and $X_2$ are each selected from the group consisting of hydrogen, halogen, nitro, thiomethyl, alkyl, (e.g., ethyl, methyl, propyl, butyl, neopentyl, isopropyl,) alkoxyl, (e.g., methoxyl, ethoxyl) sulfonylmethyl and the like. The substituents $X_1$ and $X_2$ can be at any one or more of the positions marked 3, 4, 5, 6, 7 and 8 on the above-indicated ring structures. The esterification is at the 1-position on the acenaphthenol or tetrahydro-1-acenaphthenol ring system.

The insecticidal compounds of this invention are prepared by esterifying 1-acenaphthenol, tetrahydro-1-acenaphthenol, and substituted derivatives thereof, with cyclopropanecarboxylic acids or acid halides in the manner hereinafter detailed. 1-Acenaphthenol is prepared by the oxidation of acenaphthene, an abundant constituent of coal tar (see L. Fieser and J. Cason, *J. Amer. Chem. Soc.*, 62, 432, 1940). Substituted acenaphthenes suitable for use in the preparation of the substituted 1-acenaphthenols useful in this invention can be prepared using standard synthetic procedures. The substituted acenaphthenes can be oxidized to the corresponding substituted 1-acenaphthenols using the procedure of Fieser and Cason, above, and the resulting substituted 1-acenaphthenols then used to prepare the corresponding cyclopropanecarboxylic acid esters. The following exemplary substituted acenaphthene compounds, any of which can be converted to the corresponding substituted 1-acenaphthenols useful herein, have been reported, along with others, in *Chemical Abstracts*, Vols. 1–72, 3-chloroacenaphthene, 5-chloroacenaphthene, 3,6-dichloroacenaphthene, 5,6-dichloroacenaphthene, 5-bromoacenaphthene, 3-fluoroacenaphthene, 4-fluoroacenaphthene, 5-fluoro-6-nitroacenaphthene, 3-iodoacenaphthene, 3-thiomethylacenaphthene, 3-nitroacenaphthene, 5-nitroacenaphthene, 3,4-dinitroacenaphthene, 4-ethylacenaphthene, 4-methylacenaphthene, 4-t-butylacenaphthene, 3-isopropylacenaphthene, 3,8-dimethylacenaphthene, 5-methoxyacenaphthene, 5-methoxy-4-nitroacenaphthene, 3,7-di-t-butylacenaphthene, 5-propenylacenaphthene.

2a,3,4,5-Tetrahydro-1-acenaphthenol (and substituted derivatives thereof) can be prepared by the general procedure of Richter and Silver, *J. Org. Chem.* 33, 3283 (1968). Alternatively, these compounds (referred to herein simply as "tetrahydro-1-acenaphthenols") can be prepared by partially hydrogenating the corresponding 1-acenaphthenols, such as those disclosed above, using well-known procedures (e.g., Pd/C hydrogenation).

The following 1-acenaphthenol and tetrahydro-1-acenaphthenols are preferred for use in the preparation of the compounds of this invention by virtue of their low cost, ease of preparation and the high insecticidal activity of the cyclopropanecarboxylic esters which they form: 1-acenaphthenol, 6-chloro-1-acenaphthenol, 5-nitro-1-acenaphthenol, 5,6-dichloro-1-acenaphthenol, 5-methoxy-1-acenaphthenol, tetrahydro-1-acenaphthenol and 6-chloro-tetrahydro-1-acenaphthenol.

The cyclopropane carboxylic acids used to prepare the insecticidal esters of the instant invention can be prepared by standard procedures disclosed in the art. The copending application of Fanta, Ser. No. 23,513, above, describes the preparation of 3-(2,2-tetramethylene ethenyl)-2,2-dimethylcyclopropanecarboxylic acid; chrysanthemoyl chloride can be prepared in the manner of Crombie, et al., *J. Chem. Soc.* 3552 (1950); 2,2,3,3-tetramethylcyclopropanecarboxylic acid can be prepared in the manner of Matsui and Kitahara, *Agr. Biol. Chem.* (Tokyo) 31, 1143 (1967) and converted to the acid chloride using thionyl chloride.

The following gross synthetic scheme outlines the preparation of the insecticidal esters of this invention:

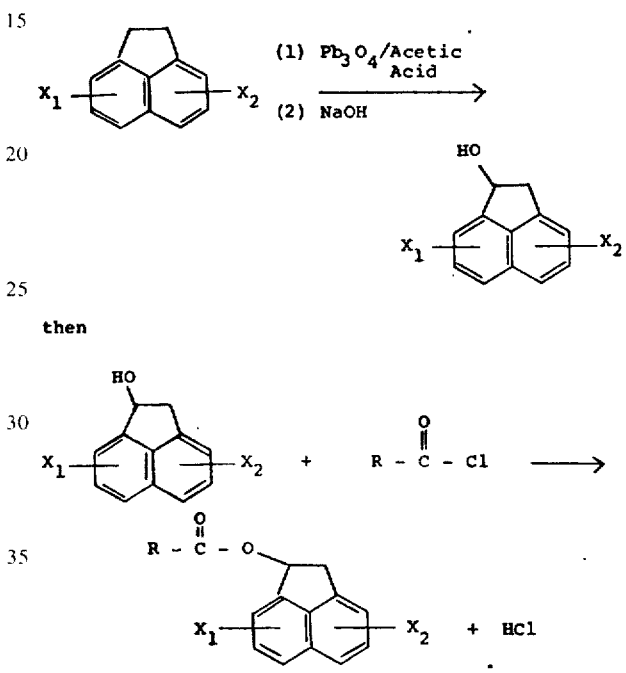

wherein R, $X_1$ and $X_2$ are disclosed above.

According to the above outline, the esters of this invention are prepared by a step-wise process comprising: (1) preparing the 1-acenaphthenol, tetrahydro-1-acenaphthenol, or derivatives thereof according to the procedures described in the foregoing references; (2) esterifying the alcohol with a stoichiometric amount of a cyclopropanecarboxylic acid chloride which is also prepared by standard procedures (above).

Alternatively, the esterification step of the present invention can be effected in other ways. The 1-acenaphthenol, tetrahydro-1-acenaphthenol, or derivatives thereof as disclosed above, can be heated with the appropriate cyclopropanecarboxylic acid in the presence of a strong acid (e.g., $H_2SO_4$, $HClO_4$, etc.) in an organic solvent capable of azeotropically boiling with water, thereby removing the water formed in the esterification. The 1-acenaphthenol or tetrahydro-1-acenaphthenol compound can also be heated with a lower alkyl ester of a cyclopropanecarboxylic acid in the presence of a basic catalyst such as sodium hydroxide, potassium hydroxide, sodium alcoholate, or potassium alcoholate, and the like, while continuously removing the lower alcohol formed through transesterification of the reaction system. In such cases, the methyl, ethyl, n-propyl and iso-propyl esters of the cyclopropanecarboxylic acids are suitable. In the most preferable esterification, the 1-acenaphthenol, tetrahydro-1-acenaphthenol, or derivatives thereof, is allowed to react with a cyclopropanecarboxylic acid halide, preferably at temperatures from about 20°C to about 100°C, in an inert solvent, preferably in the presence of an agent such as pyridine, triethylamine or other suitable amine, such that the esterification proceeds with the formation of a hydrohalic acid salt within a short period of time. For this purpose, the cyclopropanecarboxylic acid chloride is the most preferred, although the acid bromide and the acid iodide can be employed.

The compounds of this invention can exist in several isomeric and optically isomeric forms, e.g., cis-configuration, trans-configuration, dextro- and levorotatory forms of each, etc., and mixtures and racemates thereof. It is intended that the claims herein be construed to encompass all such forms and mixtures thereof. Preferred insecticidal esters herein are 1-acenaphthenol chrysanthemate, 6-chloro-1-acenaphthenol chrysanthemate, 5-nitro-1-acenaphthenol chrysanthemate, tetrahydro-1-acenaphthenol chrysanthemate, 1-acenaphthenol 2,2,-3,3-tetramethylcyclopropanecarboxylate, 6-chloro-1-acenaphthenol 2,2,3,3-tetramethylcyclopropanecarboxylate, 5-nitro-1-acenaphthenol 2,2,3,3-tetramethylcyclopropanecarboxylate, tetrahydro-1-acenaphthenol 2,2,3,3-tetramethylcyclopropanecarboxylate, 1-acenaphthenol 3-(2,2-tetramethylene ethenyl)-2,2-dimethylcyclopropanecarboxylate, 6-chloro-1-acenaphthenol 3-(2,2-tetramethylene ethenyl)-2,2-dimethylcyclopropanecarboxylate, 5-nitro-1-acenaphthenol 3-(2,2-tetramethylene ethenyl)-2,2-dimethylcyclopropanecarboxylate, and tetrahydro-1-acenaphthenol 3-(2,2-tetramethylene ethenyl)-2,2-dimethylcyclopropanecarboxylate.

The preparation of the esters of the present invention is described in more detail in the following examples. The inert organic solvents used in the procedures are those which do not react with the 1-acenaphthenol or tetrahydro-1-acenaphthenol compound or with the cyclopropanecarboxylic acids or acid halides. Such solvents are preferably aprotic solvents such as hexane, benzene, acetone, ether, glyme, and the like. The examples are not intended to be limiting, but only to demonstrate the preparation of a variety of compounds of this invention.

EXAMPLE I

1-Acenaphthenol Chrysanthemate

To an ice-cold, stirred solution of 14.00 g. of (±)chrysanthemoyl chloride (cis-trans-isomer mixture) in 100 ml. of anhydrous benzene, under static argon atmosphere, was added dropwise 12.1 ml. of dry pyridine. The resulting mixture was cooled to −5°C, and 11.90 g. of solid 1-acenaphthenol, prepared in the manner of Fieser and Cason, above, was added to the benzene solution in small portions. This mixture was stirred for 2 hours at 0°C, 20 hours at room temperature, and then was poured into 500 ml. of diethyl ether. The ether solution was washed with 100 ml. of 3M HCl, two 100 ml. portions of 5% aqueous sodium carbonate, 100 ml. of saturated sodium chloride solution, and dried over anhydrous magnesium sulfate. The ether was removed at reduced pressure on a rotary evaporator. The residue was vacuum dried (25°C, 0.02 mm.) and afforded 22.99 g. of (±)cis-trans-1-acenaphthenol chrysanthemate whose structure was verified by spectral measurements.

In the above procedure, the 1-acenaphthenol is replaced by an equivalent amount of the following substituted acenaphthenols, respectively: 5-chloro-1-acenaphthenol, 6-chloro-1-acenaphthenol, 6-bromo-1-acenaphthenol, 6-fluoro-1-acenaphthenol, 6-iodo-1-acenaphthenol, 5-nitro-1-acenaphthenol, 3-nitro-1-acenaphthenol, 5,6-dichloro-1-acenaphthenol, 5-methoxy-1-acenaphthenol, 5-thiomethyl-1-acenaphthenol, 5-sulfonylmethyl-1-acenaphthenol, tetrahydro-1-acenaphthenol, 3-ethyl-1-acenaphthenol; the corresponding substituted 1-acenaphthenol and tetrahydro-1-acenaphthenol chrysanthemates are secured.

Using the apparatus and procedures of Example I, above, 3-(2,2-tetramethylene ethenyl)-2,2-dimethylcyclopropanecarboxylic acid chloride and 2,2,3,3-tetramethylcyclopropanecarboxylic acid chloride, respectively, are reacted with the following alcohols: 1-acenaphthenol, 6-chloro-1-acenaphthenol, 5-nitro-1-acenaphthenol, and tetrahydro-1-acenaphthenol and the following esters are secured: 1-acenaphthenol 3-(2,2-tetramethylene ethenyl)-2,2-dimethylcyclopropanecarboxylate, 6-chloro-1-acenaphthenol 3-(2,2-tetramethylene ethenyl)-2,2-dimethylcyclopropane carboxylate, 5-nitro-1-acenaphthenol 3-(2,2-tetramethylene ethenyl)-2,2-dimethylcyclopropanecarboxylate, tetrahydro-1-acenaphthenol 3-(2,2-tetramethylene ethenylcyclopropanecarboxylate, 1-acenaphthenol 2,2,3,3-tetramethylcyclopropanecarboxylate, 6-chloro-1-acenaphthenol 2,2,3,3-tetramethylcyclopropanecarboxylate, 5-nitro-1-acenaphthenol 2,2,3,3-tetramethylcyclopropanecarboxylate and tetrahydro-1-acenaphthenol 2,2,3,3-tetramethylcyclopropanecarboxylate.

The following test is intended to illustrate the insecticidal properties of a representative ester herein, but is not intended to limit the scope of the invention.

Insecticidal Evaluation

An insecticidal composition comprising the ester of (±)cis-trans-1-acenaphthenol chrysanthemate from Example I, dissolved in acetone and dispersed in distilled water with Triton X-100* emulsifier was prepared. The composition was applied for a ten second period to houseflies retained in a 2 inches × 5 inches diameter screened cage. The spray was applied from a Waters vertical spray tower operating at 10 p.s.i. and discharging about 30 ml. of material per minute through an atomizer. The spray descends through an 8 inches stainless steel cylinder to test insects below the atomizer. The insects were retained in the sprayed cages for mortality observations. Test compositions having the indicated percentage concentration of weight (W) of test compound to spray volume (V) were utilized in the tests. The results are set forth in Table 1 below.

* Isooctyl phenyl polyethoxy ethanol OPE 9-10 supplied by Rohm & Haas Company.

TABLE 1

Housefly Tests - Knock-Down and Kill

| Ester | % W/V | Average % Knock-Down (2 hours) | Average % Mortality (24 hours) |
|---|---|---|---|
| 1-acenaphthenol chrysanthemate | 0.1 | 100 | 100 |
| Same | 0.05 | 96 | 70 |
| Same | 0.01 | 4 | 56 |

As can be seen from the foregoing data, a representative compound of this invention possesses excellent insecticidal properties. Additionally, the compounds of the instant invention are substantially less toxic to mammals than are most common insecticides.

Similar results are secured when 5-chloro-1-acenaphthenol chrysanthemate, 6-chloro-1-acenaphthenol chrysanthemate, 5,6-dichloro-1-acenaphthenol chrysanthemate, 5-methoxy-1-acenaphthenol chrysanthemate, 6-chlorotetrahydro-1-acenaphthenol chrysanthemate, 7-ethyl-tetrahydro-1-acenaphthenol chrysanthemate, and 5-nitro-1-acenaphthenol chrysanthemate, respectively, are incorporated in the insecticidal composition in place of the 1-acenaphthenol chrysanthemate in the above test.

Using the general procedure described above, isomer mixtures of 1-acenaphthenol 3-(2,2-tetramethylene ethenyl)-2,2-dimethylcyclopropanecarboxylate, 6-chloro-1-acenaphthenol 3-(2,2-tetramethylene ethenyl)-2,2-dimethylcyclopropane carboxylate, 5-nitro-1-acenaphthenol 3-(2,2-tetramethylene ethenyl)-2,2-dimethylcyclopropanecarboxylate, tetrahydro-1-acenaphthenol 3-(2,2-tetramethylene ethenylcyclopropanecarboxylate, 1-acenaphthenol 2,2,3,3-tetramethylcyclopropanecarboxylate, 6-chloro-1-acenaphthenol 2,2,3,3-tetramethylcyclopropanecarboxylate, 5-nitro-1-acenaphthenol 2,2,3,3-tetramethylcyclopropanecarboxylate and tetrahydro-1-acenaphthenol 2,2,3,3-tetramethylcyclopropanecarboxylate, respectively, are applied to houseflies, to Southern army worm, the Mexican bean beetle, the pea aphid, the adult mosquito, adult stable flies, black carpet beetle larva, webbing clothes moth larva, adult rice weevils, and adult sawtooth grain beetles and these insects are controlled. As can be seen, the compounds herein are effective against a wide variety of insects.

Insecticidal compositions containing the esters of the present invention can be formulated and utilized as oil solutions, emulsifiable concentrates, wettable powders, dusts, aerosols, or impregnated into wood, fabrics, etc., and provide a long lasting residual effect. Such compositions can include the generally employed carriers or diluents and auxiliary agents which are well-known to those skilled in the art. For example, suitable dusts can be prepared by admixing the compounds of the invention with dry free-flowing powders such as clay, bentonite, fuller's earth, diatomaceous earth, pyrophyllite, attapulgite, calcium carbonate, chalk or the like. The active compounds of the invention normally comprise up to about 10% by weight of such dust formulations. An amount of up to about 3% is preferred and is suitable for most applications.

Likewise, suspensions or dispersions of the compounds in a non-solvent, such as water, can be suitably employed for the treatment of foliage. Also suitably employed are solutions of the insecticides of this invention in oil which is emulsified in water. Examples of oil solvents include hydrocarbons such as benzene and toluene, halogenated hydrocarbons such as chlorobenzene, chloroform, fluorotrichloromethane and dichloro-difluoromethane, and commercial mixtures of hydrocarbons such as the common Stoddard solvent, petroleum ethers, and the like.

Aerosols can be prepared by dissolving the compounds of the invention in a highly volatile liquid carrier such as trifluorochloromethane, nitromethane, dichlorodifluoroethane and the like, or by dissolving such compounds in a less volatile solvent, such as benzene or kerosene, and admixing the resulting solution with a highly volatile liquid aerosol carrier such as the polyfluorohydrocarbons commonly used as aerosol propellants.

The insecticidal esters of this invention are useful for destroying a variety of insects. Accordingly, a method aspect of the present invention comprises combating insects by applying to said insects, or to an insect habitat, one or more of novel compounds disclosed herein.

Preferably the esters of this invention are employed in combination with a synergistic agent, for example, piperonyl butoxide, piperonyl sulfoxide, β-butoxy-β'-thiocyanodiethyl ether and the like.

What is claimed is:

1. A process for combatting insects comprising applying to said insects, or to their habitat, an insecticidally effective amount of a cyclopropanecarboxylic acid ester of the formula

wherein R is a cyclopropane moiety selected from the group consisting of

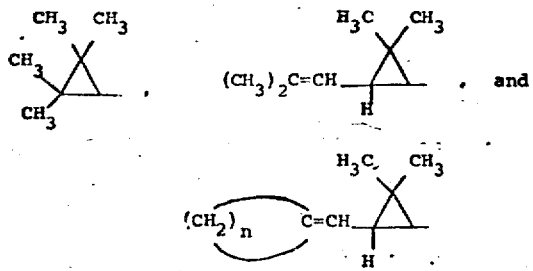

wherein $n$ is an integer of from 4 to 6 and wherein R' is a 1-acenaphthenyl or tetrahydro-1-acenaphthenyl moiety of the formula

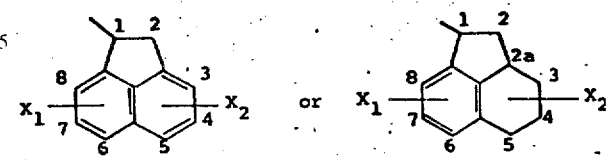

wherein $X_1$ and $X_2$ are each selected from the group consisting of hydrogen, halogen, nitro, thiomethyl, straight or branched chain alkyl containing from about 1 to 5 carbon atoms, alkoxyl containing from about 1 to 2 carbon atoms and sulfonylmethyl.

2. The process according to claim 1 wherein the cyclopropanecarboxylic acid ester is a member selected from the group consisting of 1-acenaphthenol chrysanthemate, 6-chloro-1-acenaphthenol chrysanthemate, 5-nitro-1-acenaphthenol chrysanthemate, tetrahydro-1-acenaphthenol chrysanthemate, 1-acenaphthenol 2,-2,3,3-tetramethylcyclopropanecarboxylate, 6-chloro-1-acenaphthenol 2,2,3,3-tetramethylcyclopropanecarboxylate, 5-nitro-1-acenaphthenol 2,2,3,3-tetramethylcyclopropanecarboxylate, tetrahydro-1-acenaphthenol 2,2,3,3-tetramethylcyclopropanecarboxylate, 1-acenaphthenol 3-(2,2,-tetramethylene ethenyl)-2,2-dimethylcyclopropanecarboxylate, 6-chloro-1-acenaphthenol 3-(2,2-tetramethylene ethenyl)-2,2-dimethylcyclopropanecarboxylate, 5-nitro-1-acenaphthenol 3-(2,2-tetramethylene ethenyl)-2,2-dimethylcyclopropanecarboxylate, and tetrahydro-1-acenaphthenol 3-(2,2-tetramethylene ethenyl)-2,2-dimethylcyclopropanecarboxylate.

* * * * *